United States Patent Office 3,093,157
Patented June 11, 1963

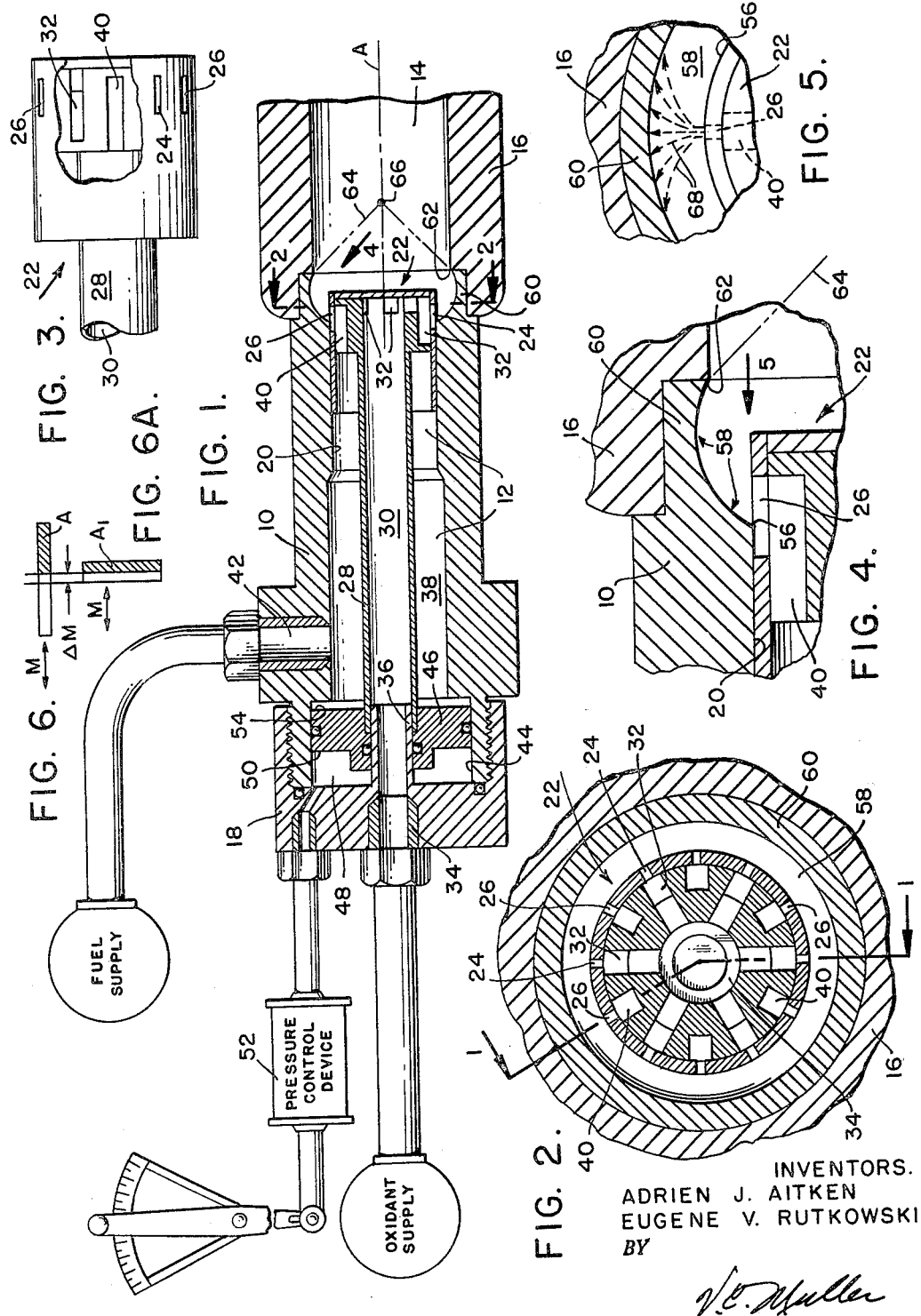

3,093,157
METERING AND MIXING APPARATUS
Adrien J. Aitken, Sunnyvale, and Eugene V. Rutkowski, China Lake, Calif., assignors to the United States of America as represented by the Secretary of the Navy
Filed Dec. 2, 1960, Ser. No. 73,462
4 Claims. (Cl. 137—605)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in apparatus for metering and mixing a liquid fuel and liquid oxidant for delivery into a combustion chamber.

The metering and mixing apparatus referred to, is employed in connection with rocket motors, gas generators, or the like to vary their output by metering the flow of reactants into a combustion chamber. In such apparatus the liquid reactants must be delivered into the combustion chamber with a flow pattern which is conducive to adequate mixing and atomization over the desired range of control. With the various devices heretofore available, the flow patterns tend to deteriorate as cut off is approached, and therefore these devices are not satisfactory for use where the range of control is required to extend substantially to cut off, as for example, in connection with auxiliary rocket motors employed to provide vernier steering control in ballistic missile and satellite vehicles, or rocket motors employed to control the ascent and descent of vertical take off and landing vehicles.

It is an object of the present invention to provide novel and improved apparatus for metering and mixing liquid reactants for delivery into a combustion chamber.

Another object is to provide improved metering and mixing apparatus capable of providing stable control over a range of flow extending substantially to cut off.

Other objects and many of the attendant advantages of this invention will be readily appreciated as the same becomes better understood by reference to the following detailed description when considered in connection with the accompanying drawing wherein:

FIG. 1 is a longitudinal central section of one form of the invention taken on line 1—1, FIG. 2;

FIG. 2 is an enlarged fragmentary section taken on line 2—2, FIG. 1;

FIG. 3 is an enlarged side elevation of the piston valve member with portions broken away;

FIG. 4 is an enlarged detail of FIG. 1 indicated by arrow 4;

FIG. 5 is an enlarged detail indicated by arrow 5, FIG. 4; and

FIGS. 6 and 6A diagrammatically compare the invention with a hypothetical construction.

Referring to the drawing and in particular to FIG. 1, a generally cylindrical body member 10 having a longitudinal axis A, has a central cavity 12, one end of which opens into a combustion chamber 14 formed by a rocket motor tube 16, or the like, and the other end of which is closed by a threaded end closure 18. The wall of cavity 12, near its open end, forms a cylindrical bore 20 in which a piston valve member 22 is slideably disposed. Valve member 22 is provided with angularly spaced outwardly directed apertures opening to its peripheral surface consisting of a set of apertures 24 for delivering oxidant and a set of apertures 26 for delivering fuel, and as best shown in FIG. 2, the apertures of one set alternate with the apertures of the other set around the periphery of the valve member in such manner that any aperture of each set is disposed between a pair of apertures of the other set.

Formed on valve member 22 is a tubular stem portion 28 which coaxially extends into the interior of cavity 12. The oxidant delivery apertures 24 communicate with the central chamber 30 of stem portion 28 through passages 32, and liquid oxidant is supplied to central chamber 30 under pressure through a port 34 in end closure 18 and a fixed tube 36 extending from closure 18 and telescopically engaging stem portion 28. The fuel delivery apertures 26 communicate with an annular chamber 38 formed between the stem portion 28 and the wall of cavity 12 through passages 40, and liquid fuel under pressure is supplied to annular chamber 38 through a port 42.

Suitable mechanical, hydraulic, electrical or other means may be provided for controllably positioning valve member 22, exemplary of which is a preferred hydraulic arrangement employing a minimum of moving parts and in which the wall of cavity 12 adjacent end closure 18 forms a cylindrical bore 44 containing an annular piston 46 affixed to end of stem portion 28 and having its outer surface slideably engaging bore 44 and its inner surface similarly engaging tube 36. An annular expansible chamber 48 is thus formed between end closure 18 and the confronting face 50 of piston 46, which chamber contains a liquid under a variable hydrostatic pressure determined by a suitable pressure control device 52. The opposite face 54 of the piston is acted upon by the liquid fuel in chamber 38, which is maintained at a constant pressure by the fuel supply, providing a constant force biasing valve member 22 to move toward end closure 18. The position of piston 46 and in turn valve member 22 is determined by the balance between the constant pressure of the fuel supply and the pressure of the fluid in chamber 48.

As best shown in FIG. 4, the end of bore 20 adjacent the combustion chamber forms a circular edge 56, and the discharge orifices or mouths of the apertures are disposed to pass across the edge in such manner that the edge uncovers a like proportion of the mouth areas of both sets. It will be apparent that the portion of the mouths of the apertures uncovered by edge 56 constitutes the effective aperture area, and that by positioning valve member 22 relative to body member 10 the total effective aperture area of both sets of apertures may be simultaneous and proportionately varied to thereby simultaneously meter the flow of oxidant and fuel therethrough. The mouths of the apertures, particularly near cut off, are preferably formed as narrow slots, the lengths of which are substantially in excess of their widths, and extending in directions parallel to axis A, permitting more gradual changes in flow rates under incremental valve movements close to the cut off position, to provide a stable control over a range of flow rates extending substantially to cut off. This has been diagrammatically illustrated in FIG. 6 which represents one of the elongated slots parallel to the direction of valve movement, shown by arrow M, as compared with FIG. 6A which represents a hypothetical slot perpendicular to the direction of valve movement. It will be apparent that a small increment of valve movement M has a minor effect on the remaining area A of FIG. 6 as compared with the remaining area A' of FIG. 6A.

Adjacent and extending longitudinally from circular edge 56, is a liquid deflecting surface 58 formed by an annular wall portion 60 as a surface of revolution about axis A. As will be apparent, liquid fuel and liquid oxidant will issue from the apertures 24 and 26 in radial sheet-like streams, with any stream of each liquid disposed between adjacent streams of the other liquid. The shape of surface 60 is so chosen to deflect these streams to flow therealong in generally longitudinal directions toward the combustion chamber. The marginal surface 62 nearest the combustion chamber is formed as a circular converging surface and the streams will discharge from surface 62 into combustion chamber 14 in converging flow paths directed along the surface of an imaginary conical surface 64 tangent to surface 62 and having an apex 66 along axis A. It will be apparent that at some point along convergent surface 62 or imaginary conical surface 64 the path of any stream of each liquid will impinge against adjacent streams of the other liquid and a high degree of mixing and atomization will occur. While directing the streams of oxidant and fuel along convergent paths will in itself produce such impingement, preferably the streams are caused to impinge prior to discharge from surface 62 by causing each stream to spread in a fan-like pattern, shown by dotted lines 68, FIG. 5, due to impingement on surface 58, which is formed as a curve of revolution formed by an outwardly convex curve as its generatrix.

Obviously many modifications and variations of the present invention are possible in the light of the above teachings. It is therefore to be understood that within the scope of the appended claims the invention may be practiced otherwise than as specifically described.

What is claimed is:

1. Apparatus for metering and mixing a liquid fuel and a liquid oxidant, comprising; a body member having a cylindrical bore open at one end thereof forming a circular metering edge, a cylindrical piston valve member slideably disposed in said bore having a plurality of outwardly directed apertures angularly spaced about the piston axis and adapted to simultaneously pass across said edge to provide metering openings of continuously variable area, said apertures comprising a first and second set for delivering oxidant and fuel, respectively, the apertures of the sets being axially elongated and angularly alternating about the axis whereby the liquid oxidant and fuel may discharge radially outwardly in spaced streams with a stream of one liquid disposed between adjacent streams of the other liquid, and an annular wall member adjacent said end of the cylindrical bore and having an inner surface adjoining said metering edge and extending axially therefrom, forming an inwardly concave surface of revolution surrounding said axis and having a converging circular discharge portion, the construction and arrangement of said apertures and annular wall member being such that the streams of liquid discharging from the apertures impinge on the wall member and spread angularly in fan-like pattern, the liquids thence being directed inwardly along the surface of a cone having its apex on said axis.

2. Apparatus for metering and mixing a liquid fuel and a liquid oxidant, comprising; a body member having a cylindrical bore open at one end thereof forming a circular metering edge, a piston valve member slideably disposed in said bore having a plurality of outwardly directed apertures angularly spaced about the piston axis and adapted to simultaneously pass across said edge to provide metering openings of variable area, said apertures comprising a first and second set for delivering oxidant and fuel, respectively, the apertures of the sets angularly alternating about the axis whereby the liquid oxidant and fuel may discharge radially outwardly in spaced streams with a stream of one liquid disposed between adjacent streams of the other liquid, and a circular concave deflecting surface adjoining said metering edge and extending therefrom having a converging discharge portion, the construction and arrangement being such that all the streams impinge against said deflecting surface to be deflected inwardly thereby to flow in directions along the surface and substantially toward the apex of an imaginary cone formed about said axis, wherein the rear end of said bore is closed and has a conduit tube extending therethrough, and a tubular stem formed on the piston valve member adapted to telescopically engage the conduit tube, the central chamber of said telescoping tubes forming a first supply zone for one of the liquid reactants communicating with one of the sets of apertures, and the annular chamber between the telescoping tubes and the bore forming a second supply zone for the other liquid reactant communicating with the other set.

3. Apparatus in accordance with claim 2, including an annular piston for adjustably positioning said cylindrical member affixed to said stem portion and slideably engaging the bore, said piston forming an expansible hydrostatic chamber between same and the rear end of the bore, and means to selectively vary the pressure in said chamber.

4. Apparatus in accordance with claim 3, wherein the front face of the piston is contiguous to said second inlet zone and the piston moves in response to the pressure differential between said control pressure chamber and the static pressure of liquid in said second supply zone.

References Cited in the file of this patent

UNITED STATES PATENTS

| | | |
|---|---|---|
| 856,981 | McCarroll | June 11, 1907 |
| 900,818 | Albright | Oct. 13, 1908 |
| 1,559,759 | Muller | Nov. 3, 1925 |
| 1,616,335 | Rochefort | Feb. 1, 1927 |
| 2,418,712 | Heymann | Apr. 8, 1947 |
| 2,482,260 | Goddard | Sept. 20, 1949 |
| 2,519,200 | Schumann | Aug. 15, 1950 |
| 2,810,259 | Burdett | Oct. 22, 1957 |